(12) United States Patent
Hazan

(10) Patent No.: US 10,556,344 B2
(45) Date of Patent: Feb. 11, 2020

(54) METHOD AND SYSTEM FOR DETERMINING A SEQUENCE OF KINEMATIC CHAINS OF A MULTIPLE ROBOT

(71) Applicant: SIEMENS INDUSTRY SOFTWARE LTD., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 0 days.

(21) Appl. No.: 16/474,189

(22) PCT Filed: Dec. 27, 2016

(86) PCT No.: PCT/IB2016/001821
§ 371 (c)(1),
(2) Date: Jun. 27, 2019

(87) PCT Pub. No.: WO2018/122567
PCT Pub. Date: Jul. 5, 2018

(65) Prior Publication Data
US 2019/0344443 A1  Nov. 14, 2019

(51) Int. Cl.
*B25J 9/16* (2006.01)
*G05B 19/402* (2006.01)
(52) U.S. Cl.
CPC .......... *B25J 9/1682* (2013.01); *B25J 9/1661* (2013.01); *B25J 9/1666* (2013.01); *G05B 19/402* (2013.01);
(Continued)
(58) Field of Classification Search
CPC ...... B25J 9/1661; B25J 9/1666; B25J 9/1682; G05B 19/402; G05B 2219/39135; G05B 2219/40448; G05B 2219/40463
See application file for complete search history.

(56) References Cited

U.S. PATENT DOCUMENTS

| | | | |
|---|---|---|---|
| 9,056,394 B2* | 6/2015 | Hazan | B25J 9/1666 |
| 2016/0023352 A1 | 1/2016 | Kennedy et al. | |
| 2019/0270202 A1* | 9/2019 | Wessen | G05B 19/41865 |

FOREIGN PATENT DOCUMENTS

EP  2998078 A1  3/2016

OTHER PUBLICATIONS

Weiwei Wan et al: "A Mid-level Planning System for Object Reorientation"; Arxiv.org, Cornell University Library; Cornell University Ithaca; NY 14853; XP080719367.
(Continued)

*Primary Examiner* — Robert T Nguyen
(74) *Attorney, Agent, or Firm* — Laurence Greenberg; Werner Stemer; Ralph Locher

(57) ABSTRACT

Systems and a method for determining a sequence of kinematic chains of a multiple robot along a sequence of locations. Inputs on the locations to be reached by a robot tool are received. Each chain is considered separately by setting one chain in use and determining, for each chain in use, available configurations for each location. The available configurations are represented as nodes of a graph representing available robotic paths for reaching with a tool the locations, while allowing the switching among different chains within the same robotic path. Valid connectors are determined by simulating collision free robot trajectories while taking into account working modality constraints of the locations. Weight factors are assigned to connectors to represent robot efforts in moving between subsequent configurations. The shortest robotic path among valid paths is determined by taking into account the weight factors. The sequence of chains is determined from the shortest path.

18 Claims, 5 Drawing Sheets

(52) U.S. Cl.
CPC ............ *G05B 2219/39135* (2013.01); *G05B 2219/40448* (2013.01); *G05B 2219/40463* (2013.01)

(56) References Cited

OTHER PUBLICATIONS

Rodriguez Carlos et al: "Planning manipulation movements of a dual-arm system considering obstacle removing"; Robotics and Autonomous Systems; Elsevier Science Publishers; Amsterdam; NL; vol. 62 No. 12; pp. 1816-1826; XP029068094; ISSN: 0921-8890; DOI:10.1016/J.ROBOT.2014.07.003.

Rodriguez Carlos et al: "Combining motion planning and task assignment for a dual-arm system"; 2016 IEEE/RSJ International Conference on Intelligent Robots and Systems (IROS); IEEE; pp. 4238-4243; XP033011974; DOI:10.1109/IROS.2016.7759624.

* cited by examiner

METHOD AND SYSTEM FOR DETERMINING A SEQUENCE OF KINEMATIC CHAINS OF A MULTIPLE ROBOT

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

BACKGROUND OF THE DISCLOSURE

Today, industrial robots are mostly single-arm robots. A typical single-arm robot has a plurality of joints (e.g. six or more joints) but only one single kinematic chain. On the robot kinematic chain, usually at its end, it is mounted an industrial tool for performing a robotic task. Examples of robotic tasks performed by tools include, but are not limited to, welding, spot welding, arc welding, painting, coating, drilling and riveting, laser cutting, hemming, and other types of manufacturing operation tasks performed by tools). The end of the robot kinematic chain may also be known as Tool Center Point Frame ("TCPF") or Tool Center Point ("TCP").

Robots belonging to the new generation of industrial robots are called twin robots. A twin robot has a plurality of joints (e.g. eight or more joints) and it has two kinematic chains. At the end of each kinematic chain it is mounted an industrial tool.

The twin robot is also known in the art as dual TCP branch robot, dual TCP robot, dual arm robot, dual head robot, dual kinematic chain robot, and the like. Herein the term twin robot is used. An industrial robot having three kinematic chains is called a triplet robot. An industrial robot having N (with N>=2) kinematic chains is herein called a multiple robot. In the foregoing a twin robot is discussed but the skilled person easily appreciates that similar considerations apply to a robot having three or more kinematic chains.

With traditional "single-arm" robots, manufacturing facilities are required, in order to increase production throughput, to buy two or more robots, to use two or more robot controllers to synchronize between them in order to avoid collisions and to maintain two or more robots.

As a consequence, in order to reduce costs while keeping the same factory production levels, twin robots and, more generally, multiple robots are more and more used in replacement of two or more traditional single-arm robots.

Moreover, one twin robot can advantageously be used for replacing one traditional single arm robot. In fact a twin robot, by having two arms, can work in a freer and more flexible manner. In addition, the fact that two tools are mounted instead of one saves cycle time compared to one single-arm robot with a tool changer.

Techniques for off-line validations and virtual 3D environment simulations and for determining optimal robot configurations for industrial tasks are known.

However such techniques are aimed at robot scenarios having only one single kinematic chain and do not work for robots having two or more kinematic chains where the complexity is higher. Therefore, improved techniques are desirable.

SUMMARY OF THE DISCLOSURE

Various disclosed embodiments include methods and corresponding systems and computer readable mediums for determining a sequence of kinematic chains of a multiple robot along a sequence of locations whereby robotic tasks are to be sequentially performed by tools. A method includes receiving inputs on the sequence of locations to be reached by a tool mounted on one of the kinematic chains of the robot. Each kinematic chain is considered separately by setting one kinematic chain in use and, for each kinematic chain in use, a plurality of available configurations is determined for each location of the sequence. The method includes representing the determined available configurations as nodes connectable by directional connectors of a graph representing a plurality of available robotic paths for reaching with one of the tools the locations of the location sequence, whilst allowing the switching among different kinematic chains within the same robotic path. A plurality of valid directional connectors connecting subsequent available configurations is determined by simulating collision free trajectories of the robot between consecutive configurations while taking into account a set of working modality constraints of the location sequence. The method includes assigning to each valid directional connector a weight factor representing the effort required by the robot in moving between the two subsequent configurations represented by the two consecutive nodes connected by the directional connector. The method includes determining, out of a plurality of valid robotic paths along valid directional connectors, the shortest robotic path by taking into account the weight factors of the directional connectors. The method includes determining the sequence of kinematic chains of the found shortest path.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for multiple robots based on a manual "trial-and-error" approach are cumbersome, tedious, error-prone, and otherwise ill-suited for the task.

Previous techniques for multiple robots based on a local approach where the optimal configuration is searched from each location point of view are sub-optimal and cause redundant movement of the joints with increased robot effort.

Embodiments determine the optimal kinematic sequence to be used during operation on a sequence of locations by a multiple robot having multiple kinematic chains.

Embodiments determine the most efficient multiple robot configuration for the full location sequence so that the multiple robot can optimally execute its tasks.

Embodiments reduce efforts of multiple robots during operation, e.g. their energy consumption and/or their cycle time.

Embodiments enable simulation, preferably by Realistic Robot Simulation ("RRS"), and thus provide a collision-free solution.

Embodiments provide a fast solution with a reduced number of calculations by using a directed acyclic graph.

Embodiments provide a solution in a three-dimensional virtual environment without employing real physical robots which may cause production delays.

Figure 1:
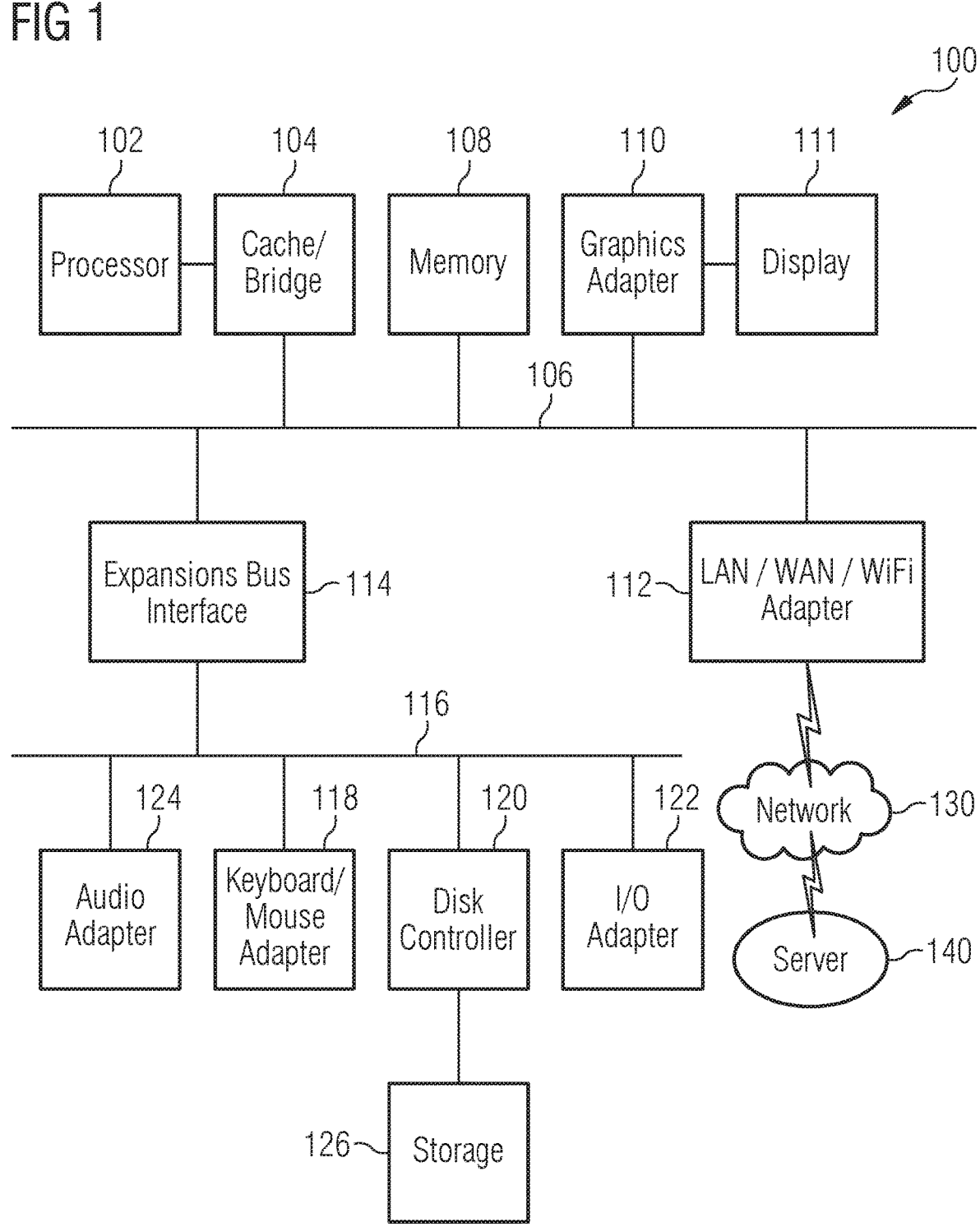
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
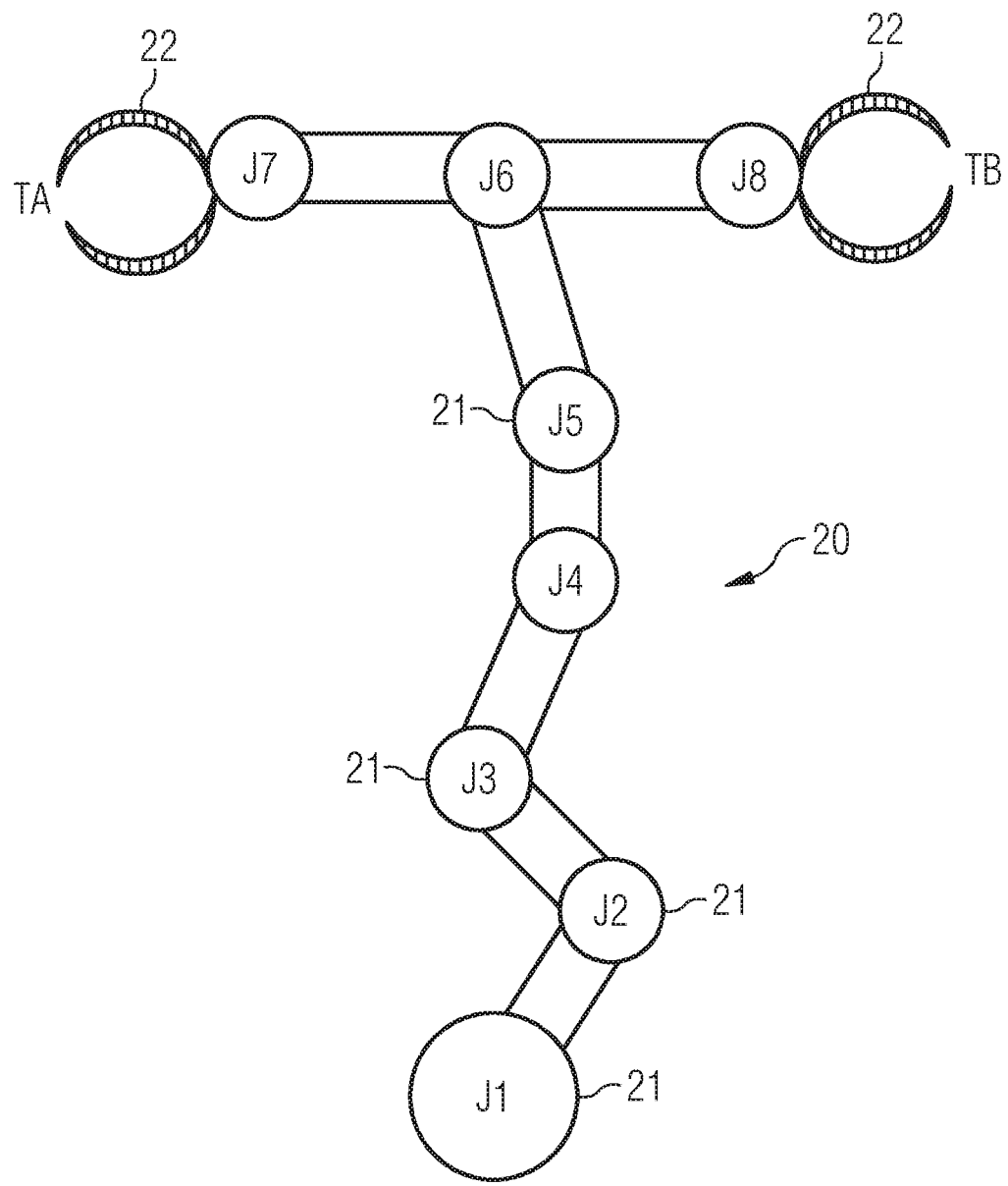
FIG. 2 illustrates a schematic view of a twin robot in accordance with disclosed example embodiments.

FIG. 2 illustrates a schematic view of a twin robot in accordance with disclosed example embodiments. The twin robot 20 has two kinematic chains, "chain A" and "chain B", and eight joints 21. Chain A is the kinematic chain connecting the eight joints J1, J2, J3, J4, J5, J6 and J7. Chain B is the kinematic chain connecting the eight joints J1, J2, J3, J4, J5, J6 and J8.

The ends of the two robot kinematic chains are the TCPs which are joints J7 and J8 for chain A and chain B respectively. On the two TCPs are mounted two industrial tools 22, which are tool TA and tool TB for chain A and chain B respectively.

As used herein, the term "configuration" denotes a robot configuration. As known in the art, the robot configuration is defined by the arrangement of the robotic joints 21 for the robot to reach a target location. The robot can reach the target location in a plurality of configurations.

Figure 3:
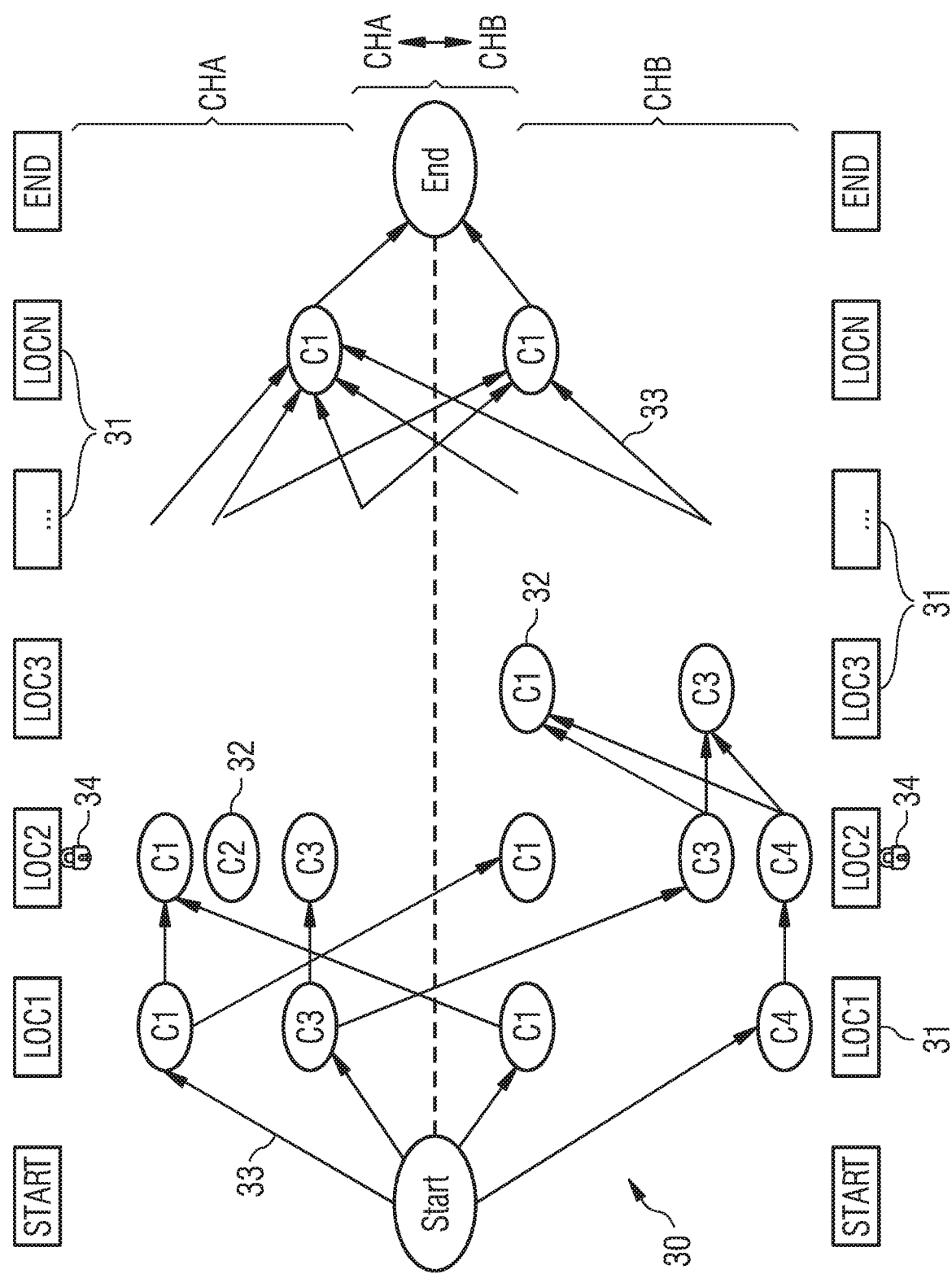
FIG. 3 illustrates a first schematic diagram of a first graph of robotic paths in accordance with a first disclosed example embodiment.

FIG. 3 illustrates a schematic diagram of a first graph of robotic paths in accordance with a first disclosed example embodiment.

The twin robot 20 is required to perform a sequence of robotic tasks along a sequence of locations 31 belonging to a robotic path. The locations are schematically illustrated by the location blocks LOC1, LOC2, LOC3 . . . to LOCN. The location sequence is a set of ordered locations to be reached by one of the tools 22 mounted on the ends of the robot kinematic chains.

It is noted that, for a traditional industrial single arm robot, a location of the robotic path is reached by one tool in a plurality of robot configurations. For a dual arm or twin robot, a location may theoretically, in absence of constraints, be reached by each one of the two tools TA, TB in a plurality of robot configurations.

Assume that during the twin robot passage of all locations 31 of the location sequence, the twin robot 20 can reach each location 31 with several tools and with several configurations and, in case of particular requirements, corresponding constraints on the locations are defined in terms of working modalities and taken accordingly into account. The study or cell layout is brought into the virtual 3D environment. The study or cell layout comprises any physical equipment and object that is present in the physical manufacturing environment such as for example robots, tools, fences, parts, conveyors, and the like.

In order to determine the optimal sequence of tools/chains for the twin robot 20 in the first embodiment of FIG. 3, available robot configurations are determined and then the shortest path is determined from all valid robotic paths represented by a graph.

For determining the available robot configuration, the exemplary algorithm steps to be performed are:

i) Set kinematic chain A as "in use" and ignore the other kinematic chain, i.e. chain B.

ii) Define a start location. For example, the start location may be taken from a previous process, from the robot home position or it may be pre-defined by user setting before the first location LOC1. Check reachability for each location of the sequence and collect the set of available configuration for each location. For each location, store all available configurations. In some embodiments, available configurations may advantageously be selected of being free from static collision. In embodiments, available configurations may be found via inverse calculation and the static collision check may be performed, without the need of simulation, e.g. by jumping the robot to each configuration.

iii) Do the same as above for the other kinematic chain, i.e. chain B.

Location constraints due to the pre-defined working modalities of the dual robot are taken into accounts. Such constraints reduce the number of available configurations. In some embodiments, such location constraints may be taken into account while performing the above algorithm steps i) to iii), in other embodiments the location constraints may be "a posteriori" applied on the available configurations resulting from the above algorithm steps i) to iii).

Examples of working modalities and their corresponding location constraints include, but are not limited to:

Location with locked configuration-state or with unconstrained configuration-state: a location may have two configuration-states, a locked configuration state, as e.g. in linear or circular motion, where the location configuration is required to be the same as the configuration of the previous location, or an unconstrained configuration state, where the switch between configurations is allowed. The configuration state of a location is typically predefined by the user when a location is set to be part of the location sequence. In case of "locked" configuration state for a location, the system marks the location accordingly, as, for example, shown with the locking icon 34 assigned to location LOC2 in FIG. 3.

Location with a locked kinematic chain state: a location may require a locked kinematic chain state or a "locked head" meaning that only the head/chain from the previous location can be used. This is for example the case when the location is very close to its previous location.

Location with a "mandatory tool/chain" state: a location may have a mandatory tool/chain state. For example, assume that on chain A is mounted tool TA of type A and on kinematic chain B is mounted tool TB of type B. On a specific location, there may be a manufacturing operation that shall be performed by the tool of type A (e.g. due, for example, to the type of operation or to the mandatory ampere requirements or any other requirements). In such a case, the specific location is marked with "chain A only" so that only kinematic chain A is allowed for this specific location.

TABLE 1

|  | LOC1 | LOC2 | LOC3 | LOC4 | LOC5 | LOC6 | LOC7 |
|---|---|---|---|---|---|---|---|
| Locked configuration |  | YES |  |  | YES |  |  |
| Mandatory chain |  |  | Chain B |  |  | Chain A |  |
| Locked head |  |  |  |  |  |  |  |
| Chain A | Conf1 | Conf1 |  |  |  | Conf1 |  |
|  |  | Conf2 |  |  | Conf2 | Conf2 | Conf2 | Conf2 |
|  | Conf3 | Conf3 |  |  | Conf3 |  |  |
|  |  |  |  |  |  | Conf4 |  | Conf4 |
| Chain B | Conf1 | Conf1 | Conf1 | Conf1 | Conf1 |  | Conf1 |
|  |  |  | Conf3 | Conf3 | Conf3 |  |  |
|  | Conf4 | Conf4 |  |  |  | Conf4 |  | Conf4 |

Table 1 is an example of the stored available configurations resulting from the algorithm steps i) to iii) where the location constraints are also taken into account.

For example, location LOC1 may be reached by the twin robot by using available configuration Conf1 or Conf3 when operating with chain A and by using available configuration Conf1 or Conf4 when operating with chain B. For example, to reach location LOC3 the twin robot can use available configuration Conf1 or Conf3 with chain B, since the other chain A is not allowed.

From the available stored configurations of Table 1, a graph 30 representing the available robot paths is generated with nodes 32 and connectors 33 as schematically shown in FIG. 3.

The nodes 32 represent available configurations for each location 31, and the connectors 33 represent the robot movement between consecutive configurations of subsequent locations taking into account the constraints defined by the working modalities. The configurations in the upper part of the diagram are configurations of kinematic chain A CHA, whilst the configurations in the lower part are configurations with chain B CHB.

Departing from the configurations of Table 1, the graph 30 of the robotic paths is generated with the exemplary algorithm steps below:

iv) A start node is generated in an artificial manner and the other graph nodes 32 are generated from the available configurations. From the start node, connectors are generated directed to each node of the first location. Furthermore, connectors are generated connecting available configurations of consecutive locations, the switching between chains, where possible, is allowed.

v) For each generated connector, the corresponding robot trajectory is simulated in order to check dynamic collision and in order to assign to the connector a weight factor representing the robot effort. Only collision free connectors are allowed. In case a collision is detected on a connector trajectory, in some embodiments, a flyby location may be added or, in other embodiments, the connector may be deleted.

vi) An end note is generated in an artificial manner. Connectors with a zero-value weight factor are generated between each node of the last location and the end node.

In the above steps iv) to vi), the working modalities constraints of the locations are taken into account as follows:

Location with unconstrained configuration state: since in such a location the switch between different configurations is allowed, for each configuration of this location a graph node is generated. Connectors from each node of the previous location to each node of the current location are generated.

Location with locked configuration state: since in such a location the configuration is set to be the same as of the configuration of the previous location, a graph node is generated for each configuration which exists both in the current and previous locations. The connector between the configuration nodes of this location and the previous location are only between each pair of the same configuration.

Location with locked head state: in such a location it is not allowed the switching between heads/kinematic chains. Therefore, a graph node is generated for each configuration of this location but connectors between nodes of previous and current locations are generated only for same kinematic chains without allowing the switching of kinematic chains.

Location with a "mandatory tool/chain" state: In such a location it is allowed only a predefined mandatory tool/chain.

The graph between the Start node and the End node schematically shown in the example embodiment of FIG. 3 is a Direct Acyclic Graph ("DAG") representing the plurality of valid robotic paths. It is noted that in FIG. 3 the weight factors assigned to the connectors are not shown.

In order to determine the optimal sequence of kinematic chains, the shortest path is determined as the "lightest" path, i.e. as the path having the smallest sum of weight factors. In order to determine the shortest path from the start to the end nodes, DAG algorithm or any other algorithm for weighted directed graphs may conveniently be used.

From the found shortest path, the optimal sequence of kinematic chains to be used is determined and provided as output result, e.g. Chain A, Chain B, Chain B, . . . , Chain A. Optionally, upon request, the optimal sequence of configurations may be also provided as output result, e.g. C3, C3, C3, . . . , C1.

The weight factor of a connector represents the robot effort and is preferably calculated during the simulation of the robot trajectory. In some embodiments, the weight factor may conveniently take into account the energy consumption and/or the cycle time between two consecutive locations.

For example, in embodiments, the weight factor may be calculated as energy consumption, as cycle time from location to location, and/or as their correlation, as follows:

Measure the energy consumption with RRS simulation of the robot during the motion between location X (with Conf(Xi)) to its following location X+1 (with Conf(Xi+1)).

Measure the cycle time with RRS simulation of robot during the motion between location X (with Conf(Xi)) to its following location X+1 (with Conf(Xi+1)).

Calculate a correlation between the measured energy and the measured cycle time. For example, any genetic algorithm instead of DAG algorithm may be used or any convenient combination of different weight factors measuring different parameters with different units, e.g. a sum of time plus energy with convenient normalization factors.

The skilled person is aware that, in other embodiments, other and/or additional effort measures may be used as weight factors, as for example joints movements for reducing robot maintenance.

In embodiments, in order to realistically represent the robot efforts through the weight factors, the robot simulation should start and end only between locations visited by the real robot, i.e. the locations where the robot waits and/or stops. Examples of such locations include but are not limited to: a location with zone="fine" or a location with one of the following Offline Programming ("OLP") commands: "Wait Time", "Weld", "Wait to Signal" and similar.

Figure 4:
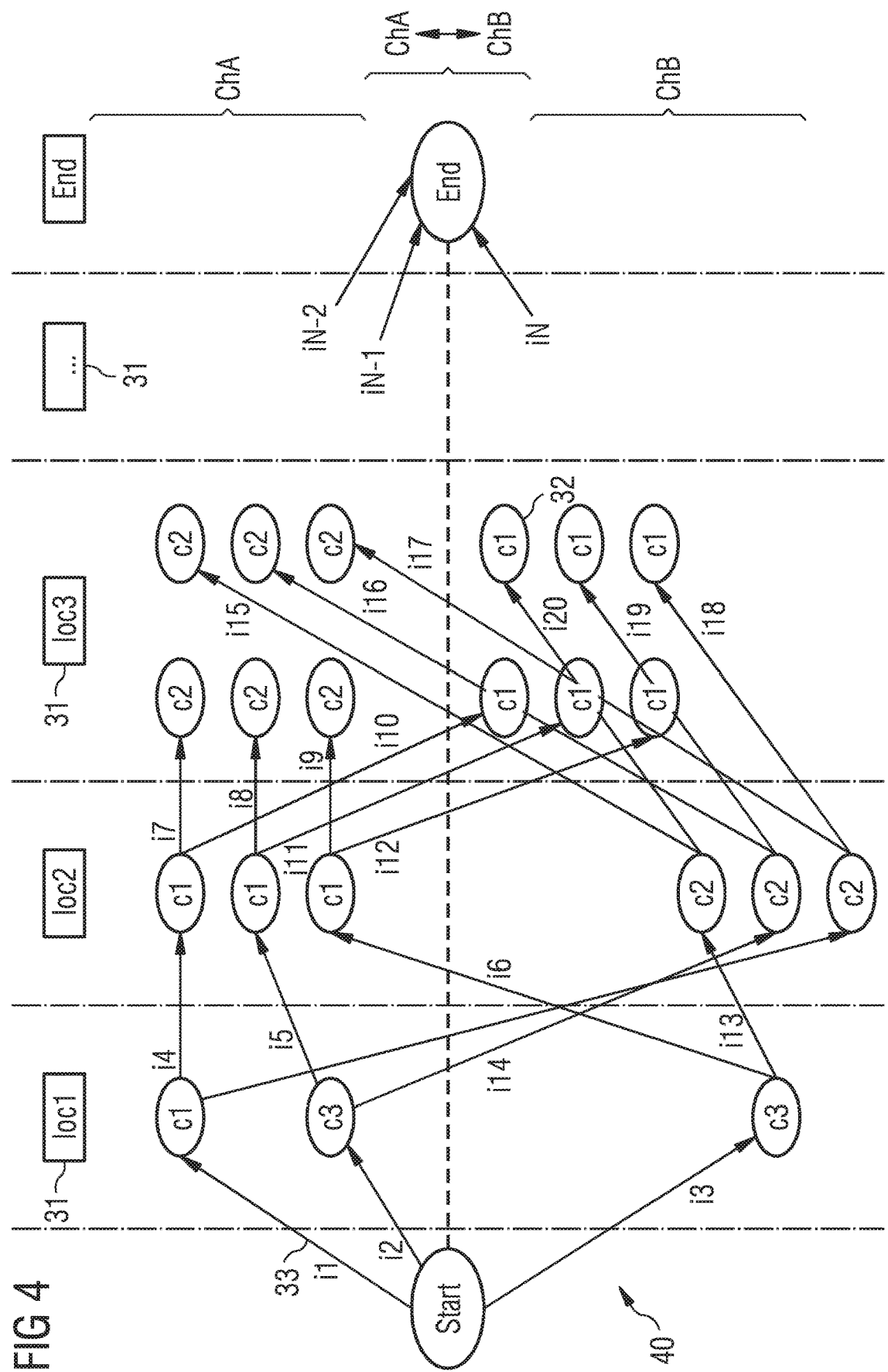
FIG. 4 illustrates a schematic diagram of a second graph of robotic paths in accordance with a second disclosed example embodiment.

FIG. 4 illustrates a schematic diagram of a second graph 40 of robotic paths in accordance with a second disclosed example embodiment The twin robot 20 is required to perform a sequence of robotic tasks along the sequence of locations 31 illustrated by the location blocks loc1, loc2, loc3.

In this second example embodiment, values of the end of chain joints J7, J8 are stored for collision detection purposes. Table 2 below is an example of stored values of the end of chain joints J7, J8 for the connectors of FIG. 4 having as identifier an index 1, 2, . . . , N corresponding to the graph identifier indexes i1, i2, . . . , iN.

The nodes 32 of the upper part of the diagram in FIG. 4 represent configurations with kinematic chain A ChA and nodes 32 of the lower part of the diagram represent configuration with kinematic chain B ChB.

TABLE 2

| Connector Index | J7 | J8 | Δ weight factor |
|---|---|---|---|
| 0 | 0 | 0 | |
| 1 | 10 | 0 | 2 |
| 2 | 20 | 0 | 3 |
| 3 | 0 | 10 | 1 |
| 4 | 15 | 0 | 1.5 |
| 5 | 17 | 0 | 2 |

TABLE 2-continued

| Connector Index | J7 | J8 | Δ weight factor |
|---|---|---|---|
| 6 | 5 | 10 | 5 |
| 7 | 90 | 0 | 0.5 |
| 8 | 30 | 0 | 3 |
| 9 | 50 | 10 | 2.7 |
| ... | ... | ... | ... |
| N-2 | 30 | 10 | 0 |
| N-1 | 50 | 0 | 0 |
| N | 90 | 10 | 0 |

As shown in Table 2, for each new connector 33, it is stored a connector index, new values for joints J7, J8, and a delta Δ weight factor.

The Δ delta weight factor is calculated by jumping to the previous values of the joints J7, J8 and by simulating the robot trajectory to the new values J7, J8 while checking collision. If no collision is detected, the calculated value of the delta weight factor is stored otherwise the connector is deleted.

It is noted that in FIG. 4, each time a new connector is to be added from a previous location, the node is cloned so that the new connector is directed to the new cloned node. The cloning is done in order to have a single way back for jumping to the previous joint values for trajectory simulation. In fact, as shown in the graph of FIG. 4, there is only one single connector directing to one node but several connectors are allowed to depart from one single node. For example on location loc2, the node 32 representing the configuration of c1 of kinematic chain B is cloned twice (see connectors having indexes i18 and i19 arriving to the two clone nodes c1).

Algorithm steps for generating the connectors 30 of the second graph 40 of the second example embodiment of FIG. 4 are the following:
i) Generate a dummy start node START.
ii) Take into account the working modalities constraints of the location, e.g. locked configuration state of the location, mandatory kinematic chain state of the location, locked kinematic chain state of the location.
iii) Save on each departing connector, the values of joints J7, J8 of the dual robot used to reach the pointed node;
iv) For each connector incoming into current node, try to send connector(s) to the next node(s) by:
    In case of moving inside chain A region, using the last connector information with the same J8 value;
    In case of moving inside chain B region, using the last connector information with the same J7 value;
    In case of moving from A to B or from B to A, no restriction at all is used.
    Jump the dual robot to the old values of joints J7, J8;
    Play the simulation forward to the next node;
    If no collision, calculate delta weight factor and assign it as value to the connector. If there is collision, delete this connector.
v) Close the graph 40 with a dummy End node, with "0" value on each arrow as already discussed.

In summary, in the above two example embodiments of FIGS. 3 and 4, for a given location sequence, valid robotic joints configurations are determined for each kinematic chain separately and at the end the switching between kinematic chains along the location sequence is allowed in order to determine the shortest robotic path by calculating realistic weight factors on simulated collision free trajectories, in the first embodiment without cloned configuration nodes and, in the second embodiment, with cloned configuration nodes.

The above embodiment examples illustrate the case of a twin robot. The skilled person is aware that the algorithm steps may be adapted for the more general case of a multiple robot having two or more kinematic chains.

Figure 5:
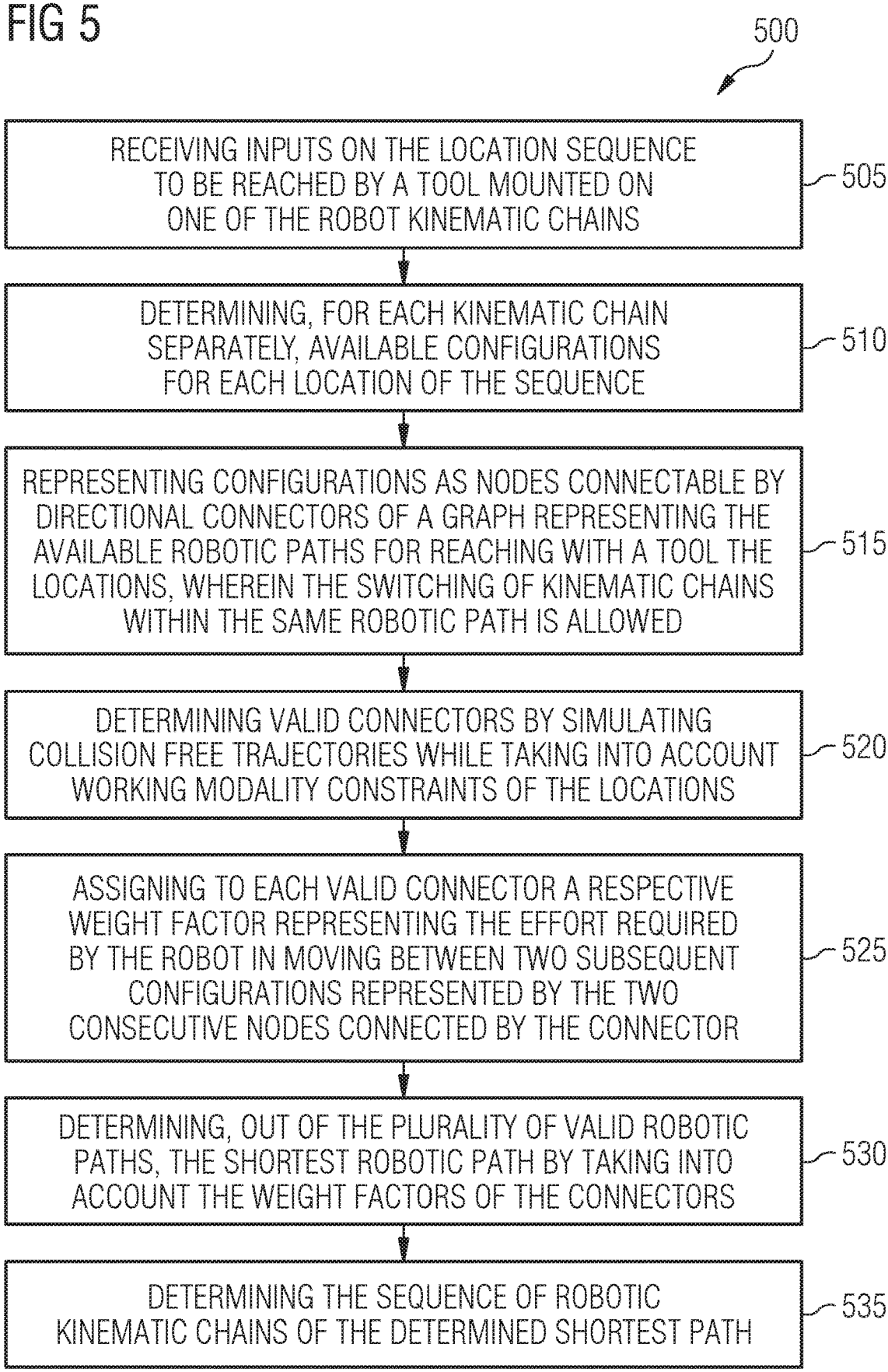
FIG. 5 illustrates a flowchart of a process for determining a sequence of kinematic chains of a multiple robot in accordance with disclosed embodiments.

FIG. 5 illustrates a flowchart 500 of a method for determining a sequence of kinematic chains of a multiple robot in accordance with disclosed embodiments. Such a method can be performed, for example, by system 100 of FIG. 1 described above, but the "system" in the process below can be any apparatus configured to perform a process as described. Along the sequence of locations, robotic tasks are to be sequentially performed by tools.

At step 505, input data on the location sequence is received. The location sequence is to be reached by a tool mounted on one of the robot kinematic chains. Additionally, it may be received input data on 3D virtual representation of the robot, on 3D virtual representation of the plurality of tools, on 3D virtual representation of a cell layout, and/or on 3D virtual representation of the plurality of parts to be manufactured.

At act 510, it is determined, for each kinematic chain separately, the available configurations in each location of the location sequence. Each kinematic chain is considered separately by setting one kinematic chain in use at a time. In embodiments, available configurations are determined via inverse calculation.

At act 515, the configurations are represented as nodes connectable through directional connectors in a graph representing the available robotic paths for reaching with one tool the locations of the location sequence. It is noted that the switching of kinematic chains within the same robotic path is allowed.

At act 520, valid directional connectors are determined by simulating collision free trajectories while taking into account at least one working modality constrain on at least one location of the location sequence. The working modality constraint on a location include, but is not limited to: a locked configuration state; a mandatory kinematic chain; and/or a locked kinematic chain.

At act 525, to each valid directional connector a weight factor is assigned. The weight factor is a measure of the effort required by the robot in moving between two subsequent configurations represented by the two consecutive nodes connected by the directional connector.

At act 530, the shortest robotic path is determined out of the valid robotic paths along valid directional connectors by taking into account the weight factors of directional connectors as measures of length. In embodiments, directional connectors are valid when there is no static and dynamic collision and when the information on the working modality constraint is taken into account.

At act 535, the sequence of robotic kinematic chains is determined out of the determined shortest path. In embodiments, upon request, also the sequence of configurations of the shortest path may advantageously be provided as output.

In embodiments, the determined available configurations at act 510 are the ones free from static collision. The static collision check is preferably done via inverse method calculation technique which yields all available collision free configurations to reach next location.

In embodiments, the weight factor assigned at act 525 is computed at act 520 during simulation. Examples of weight factors include, but are not limited to, energy consumption, cycle time, joint movement for the simulated trajectory, and/or any combination of thereof.

In embodiments, dynamic and/or collision checks are done by taking into account the geometrical model of the cell, information on robots, and on robotic path.

In embodiments, the shortest path is determined via DAG algorithm. In embodiments, simulation may preferably be RRS simulation.

One or more of the processor 102, the memory 108, and the program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for determining, by a data processing system, a sequence of kinematic chains of a multiple robot along a sequence of locations, wherein robotic tasks are to be sequentially performed by tools, the method comprising the following steps:

a) receiving inputs on the sequence of locations to be reached by a tool mounted on one of the kinematic chains of the robot;

b) considering each kinematic chain separately by setting one kinematic chain in use and determining, for each kinematic chain in use, a plurality of available configurations for each location of the sequence;

c) representing the available configurations as nodes connectable by directional connectors of a graph representing a plurality of available robotic paths for reaching with one of the tools the locations of the location sequence, wherein a switching among different kinematic chains within the same robotic path is allowed;

d) determining a plurality of valid directional connectors connecting subsequent available configurations by simulating collision free trajectories of the robot between consecutive configurations while taking into account a set of working modality constraints of the location sequence;

e) assigning to each valid directional connector a weight factor representing an effort required by the robot in moving between the two subsequent configurations represented by the two consecutive nodes connected by the directional connector;

f) determining, out of a plurality of valid robotic paths along valid directional connectors, a shortest robotic path by taking into account the weight factors of the directional connectors; and g) determining the sequence of kinematic chains of the shortest robotic path determined in step f).

2. The method according to claim 1, which comprises checking the plurality of available configurations determined in step b) to be free from static collision.

3. The method according to claim 1, which comprises receiving in step a) additional input data pertaining to one or more virtual representations selected from the group consisting of: a virtual representation of the robot, a virtual representation of the plurality of tools, a virtual representation of a cell layout, and a virtual representation of the plurality of parts to be manufactured.

4. The method according to claim 1, wherein the weight factor of step e) is selected from the group consisting of:
an energy consumption parameter of the simulated trajectory;
a cycle time parameter of the simulated trajectory;
a joint movement parameter of the simulated trajectory; and
a combination of one or more of the above parameters.

5. The method according to claim 1, wherein step g) further comprises determining the sequence of configurations of the shortest path.

6. The method according to claim 1, wherein the set of location states with working modality constraints is selected from the group consisting of:
a state with a locked configuration;
a state with a mandatory kinematic chain; and
a state with a locked kinematic chain.

7. A non-transitory computer-readable medium encoded with executable instructions which, when executed, cause one or more data processing systems to:

a) receive inputs on a sequence of locations to be reached by a tool mounted on a kinematic chain of a multiple robot;

b) consider each kinematic chain separately by setting one kinematic chain in use and determining, for each kinematic chain in use, a plurality of available configurations for each location of the sequence;
c) represent the available configurations thus determined as nodes connectable by directional connectors of a graph representing a plurality of available robotic paths for reaching with one of the tools the locations of the location sequence, wherein switching among different kinematic chains within the same robotic path is allowed;
d) determine a plurality of valid directional connectors connecting subsequent available configurations by simulating collision-free trajectories of the robot between consecutive configurations while taking into account a set of working modality constraints of the location sequence;
e) assign to each valid directional connector a weight factor representing an effort required by the robot in moving between the two subsequent configurations represented by the two consecutive nodes connected by the directional connector;
f) determine, out of a plurality of valid robotic paths along valid directional connectors, a shortest robotic path by taking into account the weight factors of the directional connectors; and
g) determine the sequence of kinematic chains of the shortest path thus determined.

8. The non-transitory computer-readable medium of claim 7, wherein the plurality of available configurations determined in item b) are checked to be free from static collision.

9. The non-transitory computer-readable medium of claim 7, wherein the inputs received in item a) include additional input data on one or more virtual representations selected from the group consisting of: a virtual representation of the robot, a virtual representation of the plurality of tools, a virtual representation of a cell layout, and a virtual representation of the plurality of parts to be manufactured.

10. The non-transitory computer-readable medium of claim 7, wherein the weight factor of item e) is selected from the group consisting of:
an energy consumption parameter of the simulated trajectory;
a cycle time parameter of the simulated trajectory;
a joint movement parameter of the simulated trajectory; and
a combination of one or more of the above parameters.

11. The non-transitory computer-readable medium of claim 7, wherein item g) further includes determining the sequence of configurations of the shortest path.

12. The non-transitory computer-readable medium of claim 7, wherein the set of location states with working modality constraints is selected from the group consisting of:
a state with a locked configuration;
a state with a mandatory kinematic chain; and
a state with a locked kinematic chain.

13. A data processing system, comprising:
a processor and an accessible memory, and wherein the data processing system is configured to:
a) receive inputs on sequence of locations to be reached by a tool mounted on a kinematic chain of a multiple robot;
b) consider each kinematic chain separately by setting one kinematic chain in use and determining, for each kinematic chain in use, a plurality of available configurations for each location of the sequence;
c) represent the determined available configurations as nodes connectable by directional connectors of a graph representing a plurality of available robotic paths for reaching with one of the tools the locations of the location sequence, wherein the switching among different kinematic chains within the same robotic path is allowed;
d) determine a plurality of valid directional connectors connecting subsequent available configurations by simulating collision free trajectories of the robot between consecutive configurations while taking into account a set of working modality constraints of the location sequence;
e) assign to each valid directional connector a weight factor representing an effort required by the robot in moving between the two subsequent configurations represented by the two consecutive nodes connected by the directional connector;
f) determine, out of a plurality of valid robotic paths along valid directional connectors, the shortest robotic path by taking into account the weight factors of the directional connectors; and
g) determine the sequence of kinematic chains of the shortest robotic path.

14. The data processing system according to claim 13, wherein the data processing system is configured to check the plurality of available configurations to be free from static collision.

15. The data processing system of claim 13, wherein the data processing system is configured to receive additional input data pertaining to one or more virtual representations selected from the group consisting of: a virtual representation of the robot, a virtual representation of the plurality of tools, a virtual representation of a cell layout, and a virtual representation of the plurality of parts to be manufactured.

16. The data processing system of claim 13, wherein the weight factor is selected from the group consisting of:
an energy consumption parameter of the simulated trajectory;
a cycle time parameter of the simulated trajectory;
a joint movement parameter of the simulated trajectory; and
a combination of one or more of the above parameters.

17. The data processing system of claim 13, wherein item g) further includes determining the sequence of configurations of the shortest path.

18. The data processing system of claim 13, wherein the set of location states with working modality constraints is selected from the group consisting of:
a state with a locked configuration;
a state with a mandatory kinematic chain; and
a state with a locked kinematic chain.

* * * * *